March 1, 1949.   O. J. KENNEL   2,463,392
AUTOMATIC GATE
Filed March 5, 1946   5 Sheets-Sheet 1
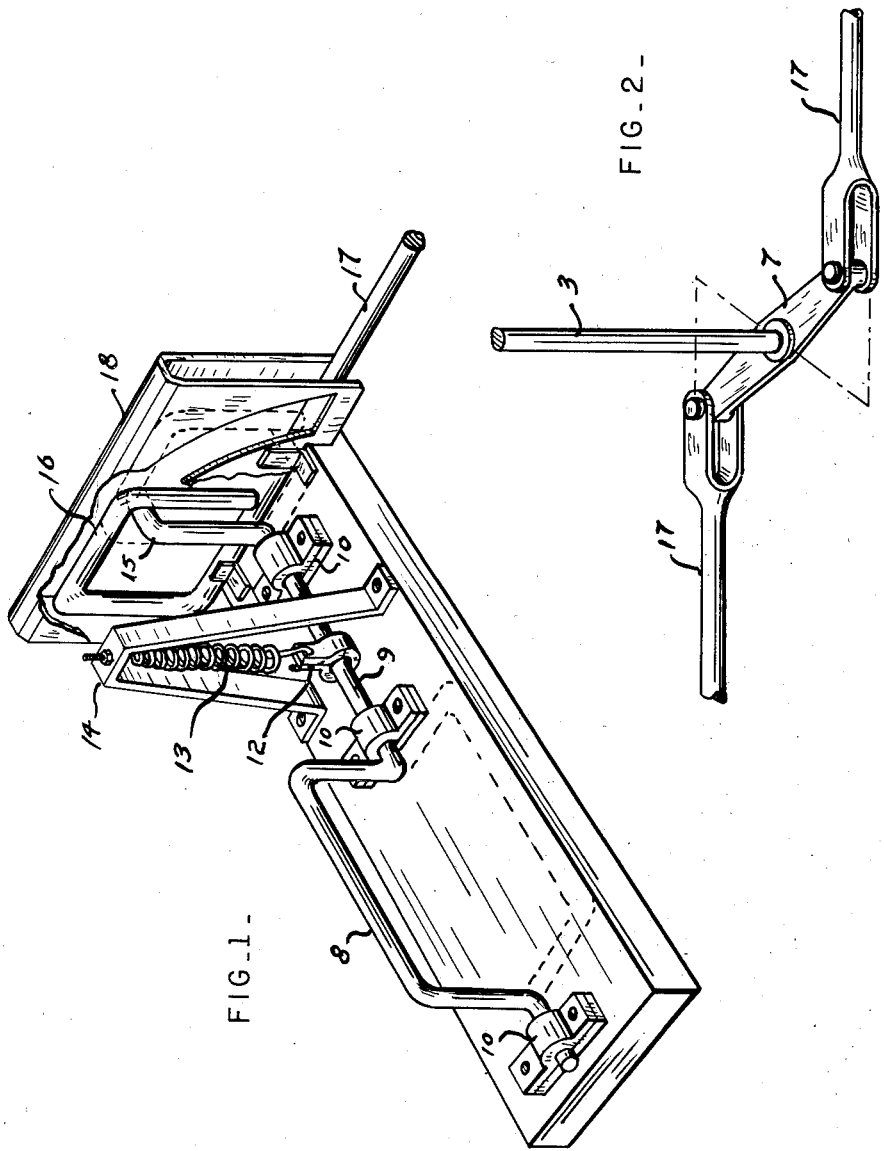
Inventor,
Otto J. Kennel,
By Frank L. Appleman,
Attorney.

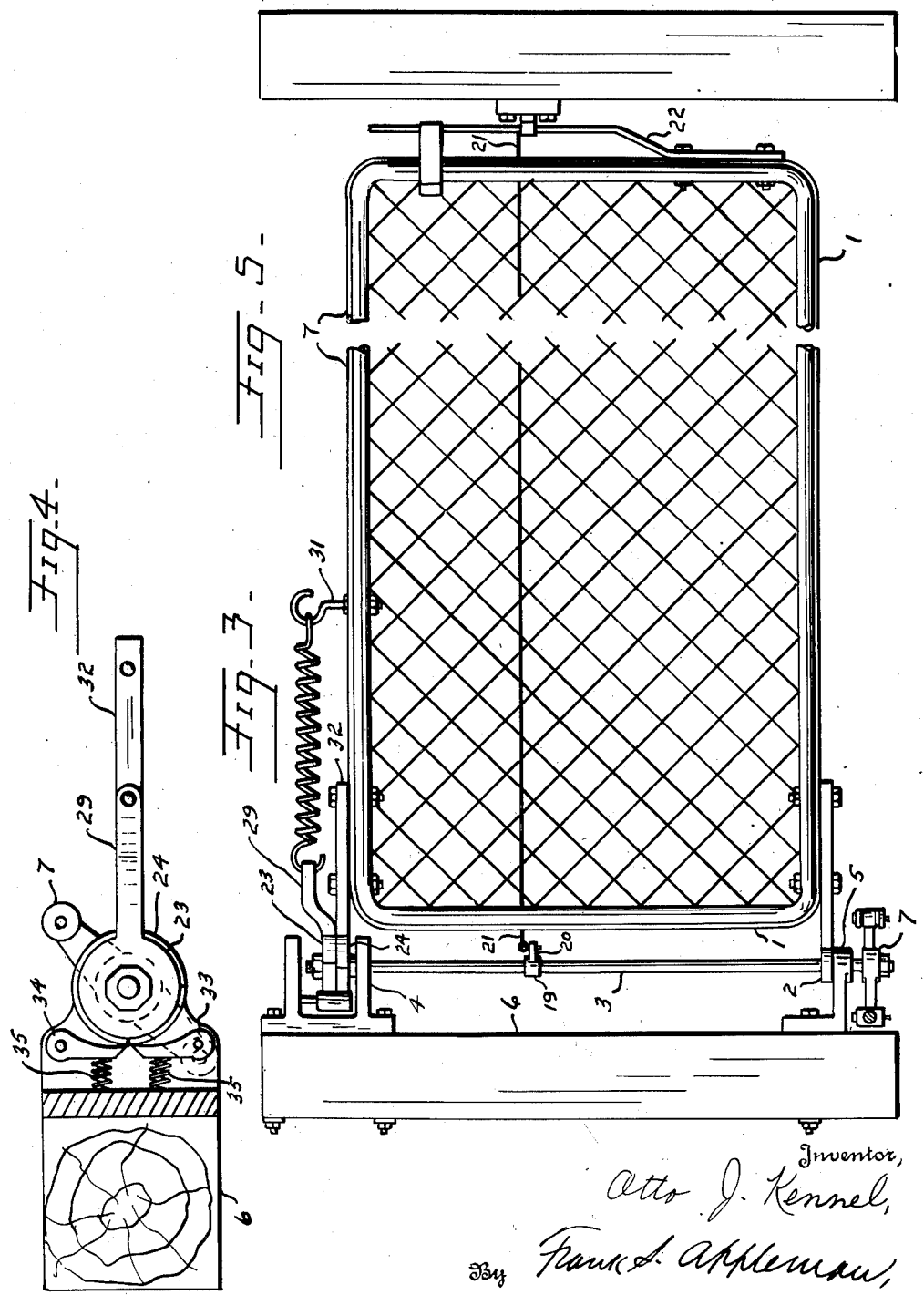

March 1, 1949.    O. J. KENNEL    2,463,392
AUTOMATIC GATE
Filed March 5, 1946    5 Sheets-Sheet 3
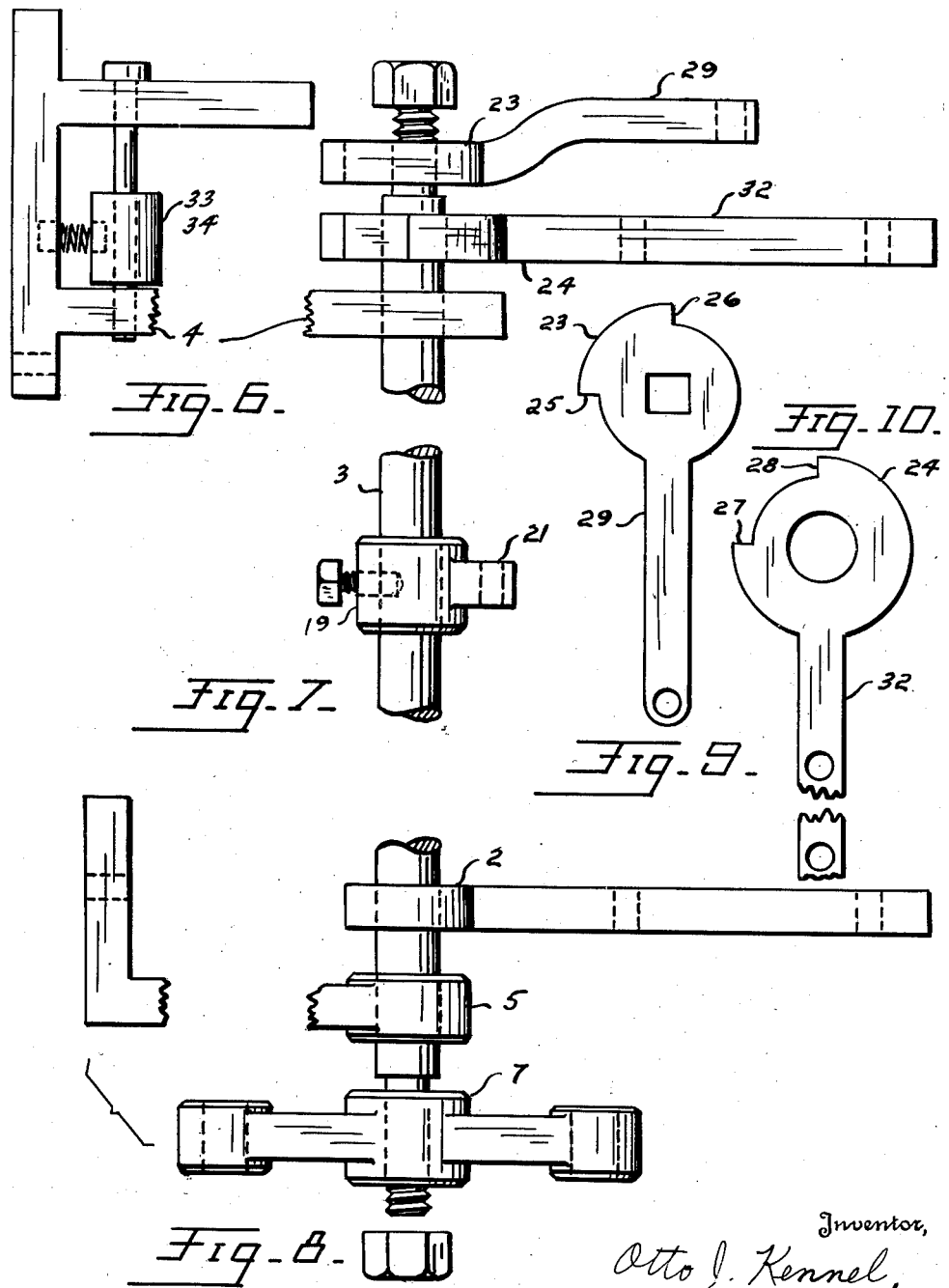

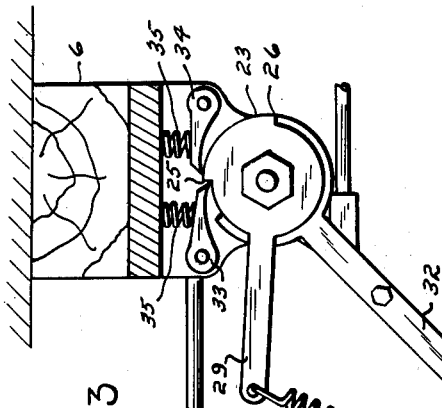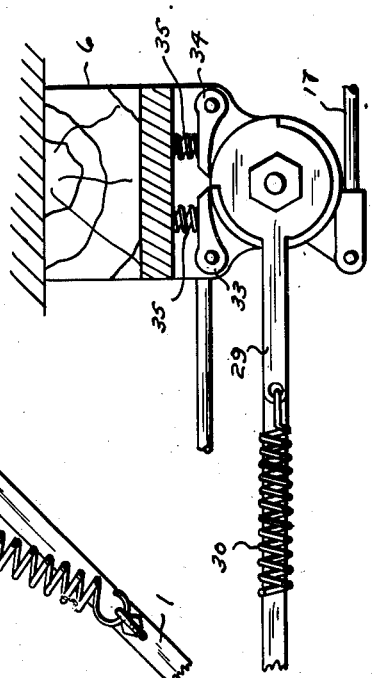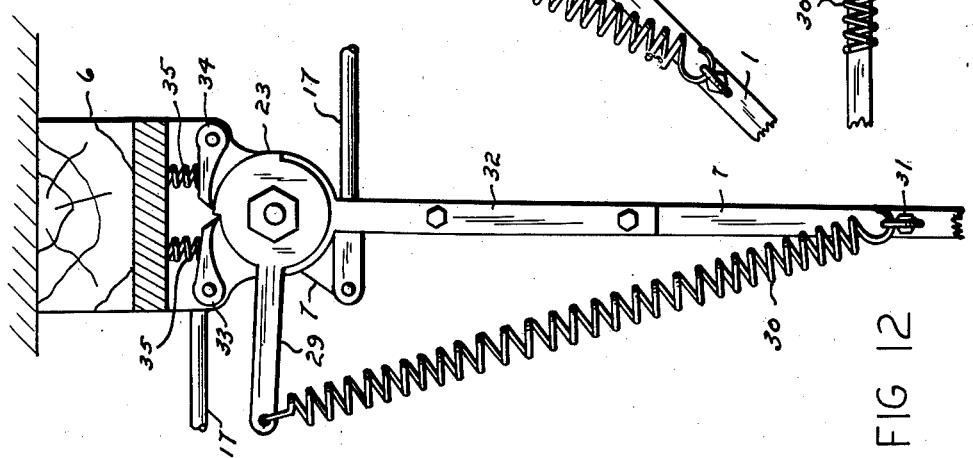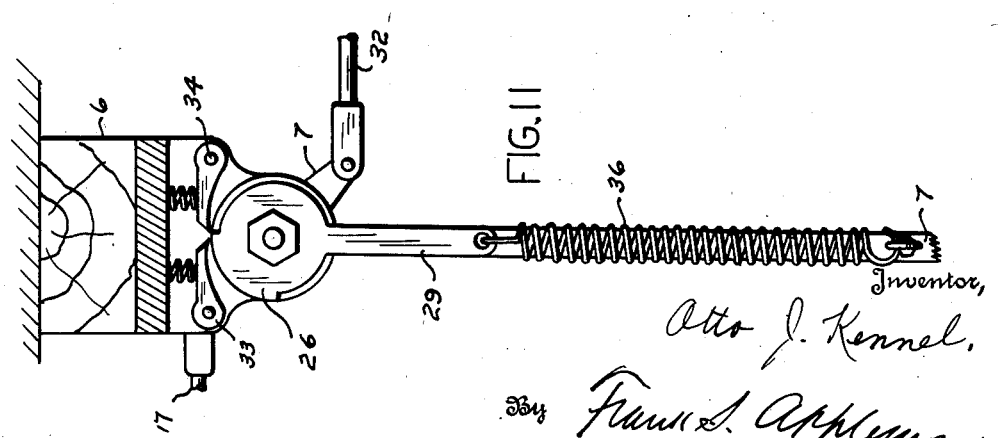

March 1, 1949. O. J. KENNEL 2,463,392
AUTOMATIC GATE
Filed March 5, 1946 5 Sheets-Sheet 5
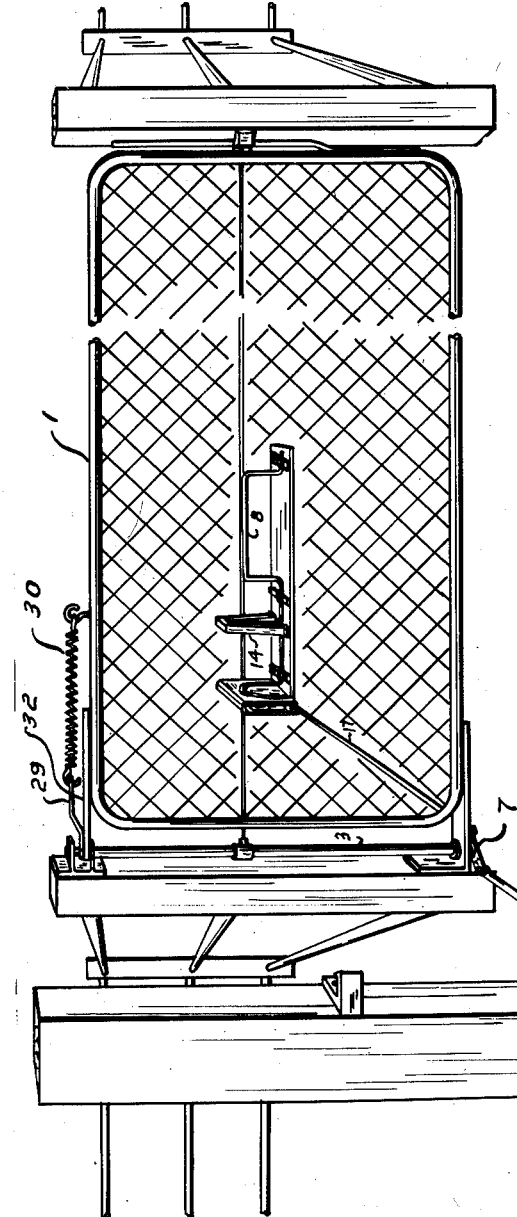
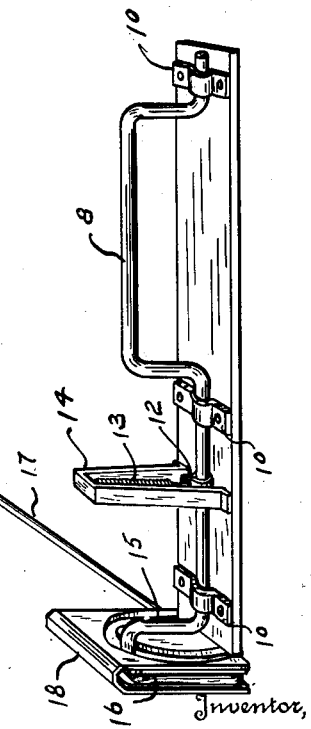
FIG.15.
Inventor,
Otto J. Kennel,
By Frank S. Appleman,
Attorney Patented Mar. 1, 1949

2,463,392

UNITED STATES PATENT OFFICE 2,463,392

AUTOMATIC GATE

Otto J. Kennel, Bloomington, Ill.

Application March 5, 1946, Serial No. 652,117

7 Claims. (Cl. 39—40)

This invention relates to automatically operated gates, and particularly to a type that is actuated by contact of wheels of vehicles, or it may be operated by the runners of a sleigh which contacts an operating lever or crank on one side of the gate for opening the said gate and which contacts a similar mechanism on the other side of the gate which is effective to return the gate to a closed position.

An object of this invention is to provide novel means for actuating a gate, which operating means acts to cushion the swing of the gate, so that when it is near its closed position, its movement is retarded to an extent that when the gate reaches the open position and contacts with the retaining post and its mechanism, it will not unduly vibrate or shock the gate to its detriment, and the same is true when the gate is returned to its closed position.

It is an object of this invention furthermore to provide a vehicle-engaged crank having novel means for returning and maintaining the crank in operative position, as will presently appear, the said vehicle operated means being effective to rotate a gate shaft mounted in bearings on a post, the said shaft having novel means for actuating or swinging the gate on the shaft; the parts being so positioned during the operation that a spring is tensioned and operative to swing the gate, means being provided by which the tension of the spring is gradually lessened as the gate reaches its open or closed position, so that a latch which is carried by the gate does not come into contact with its fastenings on the posts so as to damage the contacting elements.

It is a further object of this invention to provide ratchet disks, each having an arm, which ratchet disks are secured on the aforesaid shaft and are engaged by ratchets or dogs, as will presently appear, one of the ratchets having an arm connected to the gate and the other of said ratchets having an arm to which a spring is anchored, which spring also has its opposite end anchored to the gate so that the tensioning of the spring is relied upon as the medium for moving the gate.

A still further object of this invention is to provide a gate latch operating means on the shaft so that when the gate actuating mechanism is moved by the vehicle, the latch is automatically released and the mechanism which opens the gate is placed in operation.

A still further object of the invention is to provide a gate of the character indicated which is efficient and satisfactory in use and comparatively inexpensive to produce and maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a vehicle operated means which communicates motion to a gate shaft, it being understood that this installation is duplicated on each side of the gate;

Figure 2 illustrates a detail view showing a gate shaft with the operating connections from the vehicle operated cranks;

Figure 3 illustrates a post with the gate mounting and operating mechanism installed thereon;

Figure 4 illustrates a top plan view of the post and the gate actuating mechanism;

Figure 5 illustrates a view in side elevation of a gate showing the latch by which it is secured open or closed;

Figure 6 illustrates a view in elevation of the assembly on the shaft at the upper end thereof;

Figure 7 illustrates a detail view of the gate latch operating means;

Figure 8 illustrates a view in elevation showing the assembly at the lower end of the shaft;

Figure 9 illustrates a plan view of the upper ratchet disk;

Figure 10 illustrates a plan view of the lower ratchet disk;

Figures 11, 12, 13 and 14 illustrate views of the gate operating mechanism in different positions of adjustment; and Figure 15 illustrates a perspective view of the gate installation and its operating mechanism.

In these drawings, a gate is shown whose frame 1 has an apertured arm 2 connected to it, which arm is rotatable on a shaft 3 mounted in bearings 4 and 5, suitably secured to a post 6 with relation to which the gate swings. At the lower end of the shaft and preferably below the bearing 5, a cross arm 7 is secured to the said shaft, and it is partially rotated in opposite directions through connections with it which lead to a vehicle actuated crank 8, which crank is shaped to form a shaft 9 partially rotatable in suitable bearings 10. The shaft 9 has a collar 11 secured on it, and the collar has an arm 12 to which one end of a spring 13 is secured, the opposite end of the spring being connected to a stationary bracket 14 so that as the arm is moved from a vertical position, it is returned to said vertical position by the action of the spring 13. The shaft is also provided with a crank 15 at its end which operates in a looped portion 16 of a thrust rod 17, the end of which is pivoted to the cross arm 7. The crank 15 operates in a guide 18 and the loop 16 slides in such guide. These shaft operating parts are duplicated on each side of the gate and it is apparent that when the crank 15 is moved clockwise, it will move the cross arm to the dotted line position in which it is shown in Figure 2. The thrust rod and its link on opposite sides of the gate are provided with the same reference numerals, since they are duplicated parts.

Having now described the means for rotating the shaft, attention is directed to the fact that the shaft has a collar 19 attached to it, which collar has an arm 20 to which a latch operating element 21 is secured, so that when the shaft 3 rotates, the arm exerts a pull on the element 21 and moves the latch 22 out of engagement with the keeper or latch engaging member on the gate frame, thus freeing the gate in order that it may be swung under the influence of the operating mechanism.

The said operating mechanism, in the present embodiment of the invention, includes two ratchet disks 23 and 24 superimposed on the shaft 3, and the ratchet disk 23 has ratchet-engaging shoulders 25 and 26, whereas the ratchet disk 24 has ratchet-engaging shoulders 27 and 28, and the shoulders of one disk are oppositely positioned or faced as compared with those of the other ratchet disk. The ratchet disk 23 has an arm 29 to which an end of a spring 30 is anchored, the opposite end of said spring being anchored to the gate frame, as at 31. An arm 32 of the lower disk is attached to the gate frame, as shown in Figure 3. Dogs or ratchets 33 and 34 are pressed by springs, such as 35, into operative engagement with the ratchet disks and they engage the shoulders of said disks, as illustrated in the drawings, and when the said ratchet disks are in certain positions, their peripheries engage the ratchet teeth or dogs and disengage them from the shoulders of the dogs.

The ratchet disk 23 is secured on the shaft 3 and as the shaft is turned, as has been explained, by the movement of the vehicle operated cranks, the arm 29 is moved as it is shown in Figs. 12 and 13 and, when so moved, the spring 30 is tensioned and exerts a pull on the gate so that the gate is swung on the shaft from the position in which it is shown in Fig. 11 to the position in which it is shown in Fig. 14, the intermediate positions being shown in Figs. 12 and 13, it being understood that the latch of the gate has been operated when the shaft initially rotates under the influence of the movable cranks.

If the gate encounters an obstruction in its swinging movement, there will be no rupture of the parts as the spring will yield sufficiently even if the gate is arrested to prevent any injury to the gate or the operating parts.

Since a description of the operation of the combination has been stated in connection with a description of the several parts, it is unnecessary for an understanding of the invention to furnish a resumé of the sequence of operation of the gate opening and closing mechanism.

I claim:

1. A vehicle operated gate comprising a rotatably mounted shaft, a gate swingingly mounted on the shaft, means actuated by a passing vehicle for partially rotating the shaft in opposite directions, a ratchet disk on the shaft and having an arm, a ratchet disk rotatable on the shaft and having an arm anchored to the gate, a spring connected to the first mentioned arm and to the gate, and spring-pressed ratchets coacting with the ratchet disks for temporarily retaining them in different positions of adjustment.

2. A vehicle operated gate comprising a rotatably mounted shaft, a gate swingingly mounted on the shaft, means actuated by a passing vehicle for partially rotating the shaft in opposite directions, said means comprising cranks and their shafts, one located in the path of travel of a vehicle on each side of the gate, a cross arm on the shaft, and thrust rods connected to the cross arms and actuated by the cranks, a ratchet disk on the shaft and having an arm, a ratchet disk rotatable on the shaft and having an arm anchored to the gate, a spring connected to the first mentioned arm and to the gate, and spring-pressed ratchets coacting with the ratchet disks for temporarily retaining them in different positions of adjustment.

3. A vehicle operated gate comprising a rotatably mounted shaft, a gate swingingly mounted on the shaft, means actuated by a passing vehicle for partially rotating the shaft in opposite directions, said means comprising cranks and their shafts, one located in the path of travel of a vehicle on each side of the gate, a cross arm on the shaft, trust rods connected to the cross arms and actuated by the cranks, a spring having means for anchoring it to a crank shaft, and a bracket to which the opposite end of the spring is anchored for returning the crank and its shaft to normal position, a ratchet disk on the shaft and having an arm, a ratchet disk rotatable on the shaft and having an arm anchored to the gate, a spring connected to the first mentioned arm and to the gate, and spring-pressed ratchets coacting with the ratchet disks for temporarily retaining them in different positions of adjustment.

4. A vehicle operated gate in accordance with claim 2, in which a latch is carried by the gate for holding it in open or closed position, and in which the shaft is provided with a rigidly applied arm, and a connection between the said arm and the said latch whereby as the shaft is rotated the latch is actuated.

5. A vehicle operated gate comprising a rotatably mounted shaft, a gate swingingly mounted on the shaft, a post having bearings for the shaft, spring-pressed ratchets oscillatably mounted on the post, a ratchet disk having an arm fixed on the shaft in position to be engaged by the ratchets, a ratchet disk freely rotatable on the shaft and having an arm attached to the gate, a spring connecting the outer end of the first mentioned arm and gate for exerting tension on the gate to swing it to an open or closed position according to the position of the arm, crank-operated thrust rods, one on each side of the gate, means associated with the thrust rods for imparting partial rotary motion to the shaft in opposite directions whereby the gate is swung in opposite directions on the shaft.

6. A vehicle operated gate in accordance with claim 2, in which the thrust rods each has an elongated loop on its outer end, and in which the vehicle-operated crank shaft has a crank whose end projects into an elongated loop of the thrust rod whereby partial rotation of the crank shaft moves the said thrust rod.

7. A vehicle operated gate in accordance with claim 2, in which a latch is carried by the gate for holding it in open or closed position, and in which the shaft is provided with a rigidly applied arm with a connection between the said arm and the said latch whereby as the shaft is rotated the latch is actuated, and further characterized by the thrust rods each having an elongated loop on its outer end, and in which the vehicle-operated crank shaft has a crank whose end projects into an elongated loop of the thrust rod whereby partial rotation of the crank shaft moves the said thrust rod.

OTTO J. KENNEL.

REFERENCES CITED

The following references are of record in the file of this patent:

UNITED STATES PATENTS

| Number | Name | Date |
| --- | --- | --- |
| 308,752 | Cook | Dec. 2, 1884 |
| 365,638 | Schrock | June 28, 1887 |
| 1,177,467 | Worland | Mar. 28, 1916 |
| 1,297,949 | Werezak | Mar. 18, 1919 |
| 1,611,746 | Hasselbring | Dec. 21, 1926 |
| 1,725,354 | Jasbring | Aug. 20, 1929 |
| 1,775,792 | Wanke | Sept. 16, 1930 |
| 2,045,207 | Spooner | June 23, 1936 |
| 2,062,738 | Bigler | Dec. 1, 1936 |